US009574425B2

(12) United States Patent
Winslow

(10) Patent No.: US 9,574,425 B2
(45) Date of Patent: Feb. 21, 2017

(54) DOWNHOLE POWER GENERATION USING HYDRAULIC FLOW REGULATION

(75) Inventor: Daniel Martin Winslow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 80 days.

(21) Appl. No.: 14/241,100

(22) PCT Filed: Jul. 12, 2012

(86) PCT No.: PCT/US2012/046447
§ 371 (c)(1),
(2), (4) Date: Oct. 31, 2014

(87) PCT Pub. No.: WO2014/011175
PCT Pub. Date: Jan. 16, 2014

(65) Prior Publication Data
US 2015/0176372 A1    Jun. 25, 2015

(51) Int. Cl.
*E21B 41/00* (2006.01)
*H02K 9/06* (2006.01)
*H02K 7/18* (2006.01)
*H02P 9/06* (2006.01)

(52) U.S. Cl.
CPC ......... *E21B 41/0085* (2013.01); *H02K 7/1807* (2013.01); *H02P 9/06* (2013.01)

(58) Field of Classification Search
CPC ....... E21B 41/0085; H02P 9/06; H02K 7/1807
USPC ..................................................... 290/43, 54
See application file for complete search history.

(56) References Cited

U.S. PATENT DOCUMENTS

| 5,149,984 A * | 9/1992 | Schultz ................... E21B 34/06 290/1 R |
| 7,347,283 B1 * | 3/2008 | Sharp ....................... E21B 4/04 175/256 |
| 7,468,564 B2 * | 12/2008 | Crisafulli ............. H02K 7/1823 290/43 |

(Continued)

FOREIGN PATENT DOCUMENTS

| GB | 2376483 A | 12/2002 |
| WO | 2011071392 A1 | 6/2011 |

OTHER PUBLICATIONS

International Search Report and Written Opinion for PCT/US2012/046447 dated Mar. 27, 2013.

*Primary Examiner* — Viet Nguyen
(74) *Attorney, Agent, or Firm* — McDermott Will & Emery LLP; Benjamin Fite

(57) ABSTRACT

Systems and methods of downhole power generation are disclosed, which provide for the generation of electrical power in a downhole environment by the use of an electrical generator coupled to a hydraulic circuit that receives energy from a source in the downhole environment. The hydraulic circuit can receive energy from flowing drilling fluid and/or from kinetic energy of one or more portions of the drill string. A direct or indirect coupling can be used to transfer energy from the downhole environment to a pump in the hydraulic circuit, which can act as a hydraulic flow source, providing flow through a flow regulation device or control circuit. The hydraulic fluid under such control can then be used to turn a hydraulic motor, which is used to turn an electric generator for the generation of electricity for downhole tools such as logging tools, related telemetry, and the like.

24 Claims, 4 Drawing Sheets

(56) References Cited

U.S. PATENT DOCUMENTS

| | | | |
|---|---|---|---|
| 7,759,811 B2* | 7/2010 | Boisvert | F15B 7/008 180/65.1 |
| 2005/0012340 A1 | 1/2005 | Cousins | |
| 2006/0113803 A1 | 6/2006 | Hall et al. | |
| 2009/0288408 A1* | 11/2009 | Tozawa | E02F 9/2075 60/435 |
| 2010/0071910 A1* | 3/2010 | Ellson | E21B 41/0085 166/385 |
| 2010/0133833 A1* | 6/2010 | Williams | E21B 4/02 290/50 |
| 2010/0327681 A1* | 12/2010 | Perry | H02K 7/1807 310/71 |
| 2011/0198848 A1* | 8/2011 | Rytlewski | H02K 7/1823 290/52 |
| 2012/0292909 A1* | 11/2012 | Eriksen | E21B 41/0085 290/52 |
| 2013/0228373 A1* | 9/2013 | Scholz | E21B 4/04 175/24 |

* cited by examiner

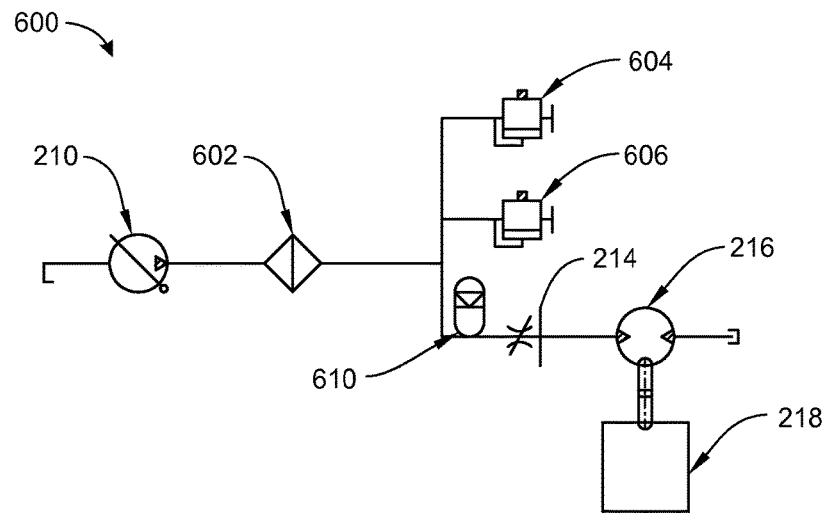
FIG. 6
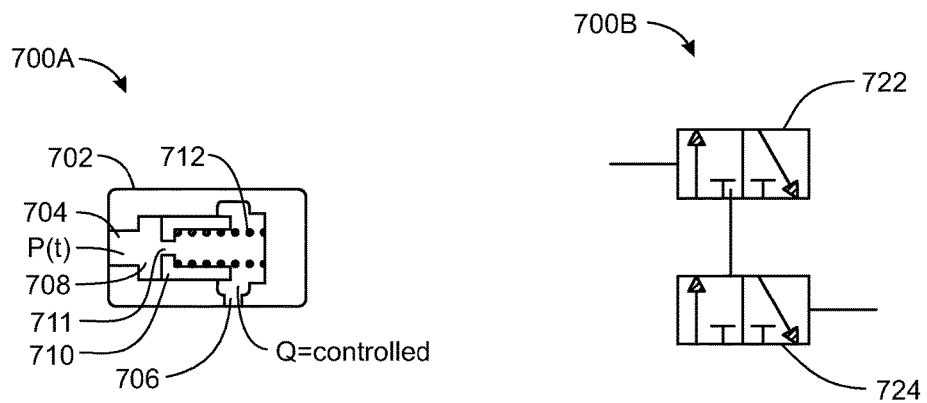
FIG. 7A
FIG. 7B

DOWNHOLE POWER GENERATION USING HYDRAULIC FLOW REGULATION

This application is a National Stage entry of and claims priority to International Application No. PCT/US2012/046447, filed on Jul. 12, 2012.

BACKGROUND

The present disclosure relates generally to downhole power generation systems and methods and, more particularly, to downhole power generation systems and methods that utilize hydraulic fluid flow regulation to generate electrical power.

Modern hydrocarbon drilling and production operations can often require that electrical power be supplied to equipment in the downhole environment. For example, electrical power is required downhole for a number of applications, including well logging and telemetry. Well logging of the borehole often includes the use of active sensors that require power to obtain information about the downhole environment. Such information will typically include the various characteristics and parameters of the earth formations traversed by the borehole, data relating to the size and configuration of the borehole itself, pressures and temperatures of ambient downhole fluids, and other vital downhole parameters. Telemetry commonly utilizes electrical power to relay data acquired from various logging sensors in the downhole environment to the surface.

The supply and generation of electrical power downhole, however, can be problematic for a number of reasons. For instance, the storage of electrical power in certain regions of the wellbore can be problematic due to high temperatures and other harsh conditions that are outside the operational limits of conventional batteries and capacitors.

One approach to generating power downhole utilizes the circulating drilling fluid (or "mud") which serves to operate a downhole generator or turbine. At least one problem with this approach is that when the mud flow ceases, downhole power production capabilities are lost, and some downhole applications require electrical power even in the absence of mud flow. Additionally, due to the potential extreme flow rates that the circulating mud may attain, any such generator or turbine is typically oversized relative to generators and turbines used with typical mud flow rates. The increased size of the generator or turbine leads to lower than optimal efficiency and increased cost. There is currently no adequate resolution for this issue in regions of the wellbore in which power currently cannot be satisfactorily stored or delivered.

SUMMARY OF THE INVENTION

The present disclosure relates generally to downhole power generation systems and methods and, more particularly, to downhole power generation systems and methods that utilize hydraulic fluid flow regulation to generate electrical power.

An aspect of the present disclosure provides a downhole power generation system. The system can include an energy source that provides input energy. The downhole power generation system can include a hydraulic circuit communicably coupled to the energy source to receive the input energy at a hydraulic pump arranged within the hydraulic circuit. The hydraulic pump circulates hydraulic fluid throughout the hydraulic circuit. A flow regulation device can be communicably coupled to the hydraulic pump within the hydraulic circuit. The flow regulating device receives hydraulic fluid flow from the hydraulic pump and provides a regulated hydraulic fluid flow. A hydraulic motor may be communicably coupled to the flow regulation device within the hydraulic circuit. The hydraulic motor receives and converts the regulated hydraulic fluid flow into a power input. An electrical generator may be communicably coupled to the hydraulic motor. The electrical generator receives the power input and generates electrical power.

In some embodiments, the hydraulic circuit is communicably coupled to the energy source with a coupling, and the coupling transfers the input energy from the energy source to the hydraulic pump in the form of mechanical energy. The coupling may be a direct coupling. In some embodiments, the direct coupling may include a seal. The coupling may be an indirect coupling. The indirect coupling may include a magnetic coupling. In some embodiments, the flow regulation device is a pressure compensated, constant flow device. In some embodiments, the flow regulation device includes first and second solenoid valves that receive the hydraulic fluid flow from the hydraulic pump and discharge the hydraulic fluid back into the hydraulic circuit. The first and second solenoid valves of the flow regulation device may be configured for pulse width modulation control. The flow regulation device can be arranged in a hydraulic manifold that fluidly couples the hydraulic pump to the hydraulic motor. The energy source may include a rotating drive shaft. The energy source may include a fluid-driven turbine. The hydraulic circuit and electrical generator can be disposed in a housing arranged adjacent the energy source.

A further aspect of the present disclosure provides a method of downhole power generation. The method can include receiving input energy provided by an energy source with a hydraulic pump communicably coupled to the energy source. Hydraulic fluid can be circulated with the hydraulic pump throughout a hydraulic circuit. A hydraulic fluid flow received from the hydraulic pump can be regulated with a flow regulation device, thereby generating a regulated hydraulic fluid flow, the flow regulation device being communicably coupled to the hydraulic pump. The regulated hydraulic fluid flow can be received and converted into a power input with a hydraulic motor communicably coupled to the flow regulation device. Further for the method, the power input can be received with an electrical generator, thereby generating electrical power, the electrical generator being communicably coupled to the hydraulic motor.

In some embodiments, the hydraulic pump can be communicably coupled to the energy source with a coupling, and the input energy can be transferred from the energy source to the hydraulic pump with the coupling in the form of mechanical energy. In some embodiments, the power generation can further include distributing electrical power from the electrical generator to a downhole tool. Receiving input energy provided by the energy source with the hydraulic pump can include coupling the energy source to the hydraulic pump using a direct coupling. Receiving input energy provided by the energy source with the hydraulic pump can include coupling the energy source to the hydraulic pump using an indirect coupling.

A further aspect of the present disclosure provides a downhole power generation system that includes an energy source that provides input energy, and a plurality of power generation units. Each power generation unit can include a hydraulic circuit communicably coupled to the energy source. The hydraulic circuit receives the input energy at a hydraulic pump arranged within the hydraulic circuit and the hydraulic pump circulates hydraulic fluid throughout the hydraulic circuit. Each power generation unit can include a flow regulation device communicably coupled to the hydraulic pump within the hydraulic circuit. The flow regulation device receives hydraulic fluid flow from the hydraulic pump and provides a regulated hydraulic fluid flow. Each power generation unit can include a hydraulic motor communicably coupled to the flow regulation device within the hydraulic circuit. The hydraulic pump receives and converts the regulated hydraulic fluid flow into a power input. A power generation unit can include an electrical generator communicably coupled to the hydraulic motor. The electrical generator receives the power input and generates electrical power. The electrical generator of each power generation unit may provide the electrical power to one or more downhole tools.

In some embodiments, the hydraulic circuit of each power generation unit is communicably coupled to the energy source with a coupling, where the coupling transfers the input energy from the energy source to the hydraulic pump of each power generation unit in the form of mechanical energy. One or more of the couplings of the plurality of power generation units may include a direct coupling. The direct coupling may include a seal. One or more of the couplings of the plurality of power generation units may include an indirect coupling. The indirect coupling may include a magnetic coupling. One or more of the flow regulation devices of the plurality of power generation units may include a pressure compensated, constant flow device. One or more of the flow regulation devices of the plurality of power generation units may include first and second solenoid valves that receive the hydraulic fluid flow from the hydraulic pump and discharge the hydraulic fluid flow back into the hydraulic circuit. The first and second solenoid valves of the one or more flow regulation devices may be configured for pulse width modulation control. For a power generation unit, a flow regulation device can be arranged in a hydraulic manifold that fluidly couples the hydraulic pump to the hydraulic motor. The energy source can include a fluid-driven turbine or a rotating drive shaft. The hydraulic circuit and electrical generator of one or more of the plurality of power generation units may be disposed in a housing arranged adjacent the energy source.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 6 illustrates a hydraulic diagram of a flow regulation circuit, according to exemplary embodiments.

FIGS. 7A-7B illustrate diagrams of flow regulation devices useful for power generation in accordance with exemplary embodiments of the present disclosure.

Figure 1:
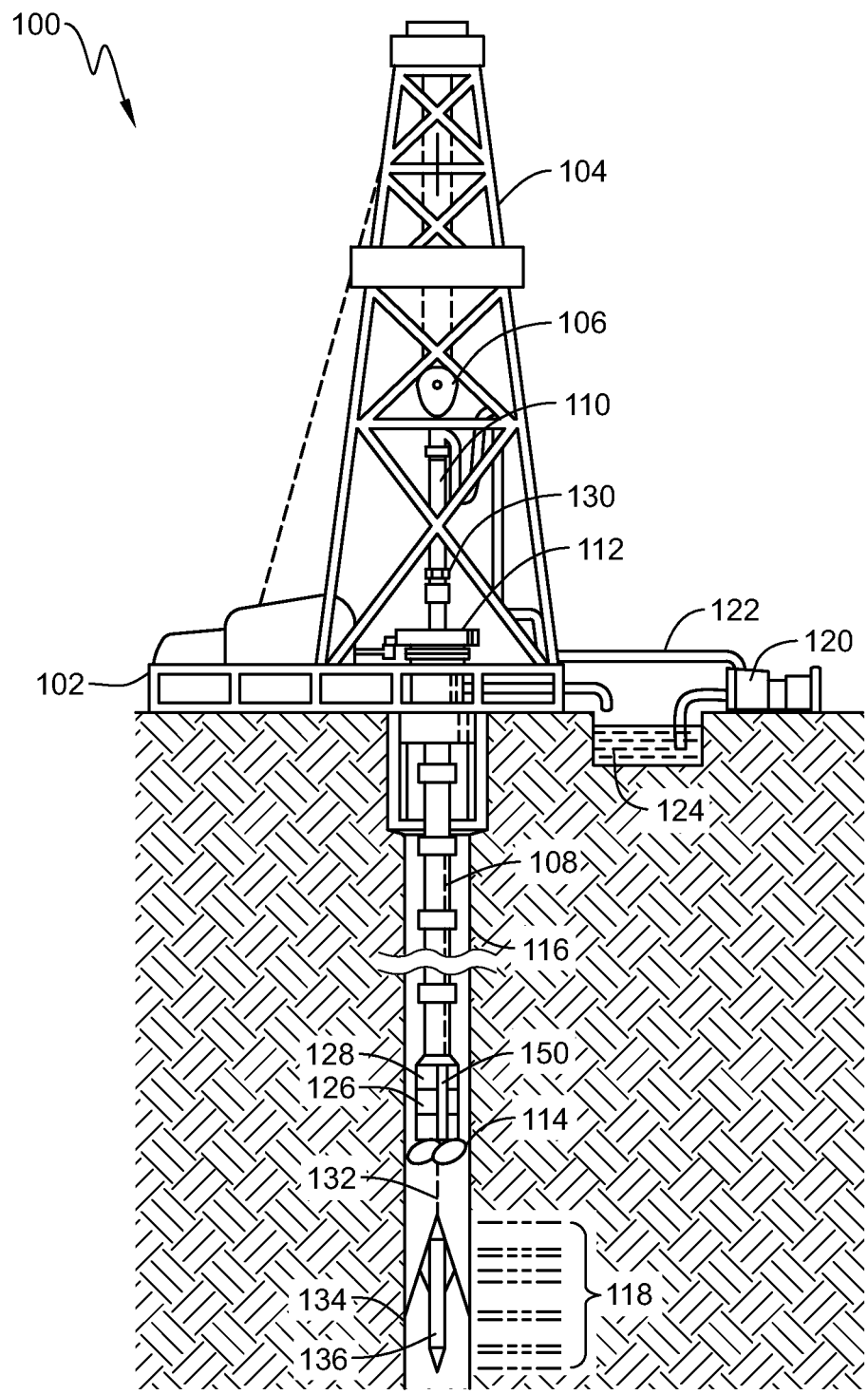
FIG. 1 illustrates a land-based oil and gas rig including a downhole power generation system in an illustrative logging environment according to the present disclosure.

While certain embodiments and aspects of the subject technology are depicted in the drawings, those skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

The present disclosure relates generally to downhole power generation systems and methods and, more particularly, to downhole power generation systems and methods that utilize hydraulic fluid flow regulation to generate electrical power.

The disclosure provides alternative ways or methods to generate downhole electrical power. For example, the subject technology, as described herein, can provide for the generation of electrical power in a downhole environment by the use of an electrical generator coupled to a hydraulic circuit that receives energy from an energy source already present in the downhole environment. In one or more embodiments, the hydraulic circuit may be configured to receive an input of energy from flowing drilling fluid and/or from the angular kinetic energy derived from one or more portions of a rotating drill string. A direct or indirect coupling can be used to transfer the energy input to a hydraulic pump arranged in the hydraulic circuit. The hydraulic pump can act as a hydraulic flow source configured to provide fluid flow to a flow regulation device or control circuit which regulates the fluid flow to an adjacent hydraulic motor. The influx of regulated fluid flow serves to rotate the hydraulic motor which may be configured to actuate an electric generator communicably coupled thereto for the generation of electricity for various downhole tools such as logging tools, telemetry devices, combinations thereof, and the like.

The flow regulation device or control circuit may be configured to provide a stable or constant flow rate of hydraulic fluid to the hydraulic motor, thereby mitigating any variations that may occur in the input energy, such as varying mud flow rates and/or a varying rotational speed of the drill string. In mud-driven applications, the hydraulic pump may be communicably coupled to a fluid-driven turbine configured to be driven by the mud and arranged either within or without the drill string. In other applications, the hydraulic pump may be disposed within a stationary housing arranged adjacent a rotating drive shaft, such as a portion of the drill string, that provides the required energy input. In some embodiments, the hydraulic pump may be configured to receive the energy input from the fluid-driven turbine or rotating drive shaft by direct attachment or connection, such as a seal arrangement. In other embodiments, the hydraulic pump may be configured to receive the energy input from the fluid-driven turbine or rotating drive shaft by indirect attachment or coupling, such as via a magnetic coupling or another type of indirect mechanical configuration.

As will be appreciated, using hydraulic fluid with the disclosed flow control regulation can provide downhole electrical power generation that is matched or otherwise optimized to a given generator size. For instance, the optimal operating speed of a particular electrical generator can be matched to the particular flow conditions provided by the flow regulation devices and other components of the hydraulic circuit. Consequently, the resulting generation of electricity will be more uniform and the given generator will be more efficient. Moreover, this may prove advantageous in reducing the complexity for any related control electronics or systems used to regulate and distribute the generated electricity. The power generation provided can also allow for a wider operational range for a given mechanical configuration, as opposed to previous techniques that would otherwise require changing of turbines, nozzles, and/or gears for different operational parameters encountered in a given downhole environment.

Referring to FIG. 1, illustrated is a land-based oil and gas rig 100 including a downhole power generation system 150 that may be employed in an illustrative wellbore logging application, according to the one or more embodiments. It should be noted that, even though FIG. 1 depicts a land-based oil and gas rig 100, it will be appreciated by those skilled in the art that the exemplary downhole power generation system 150, and its various embodiments disclosed herein, are equally well suited for use in or on other types of oil and gas rigs, such as offshore platforms or rigs, or rigs arranged in any other geographical location.

As illustrated in FIG. 1, a drilling platform 102 supports a derrick 104 having a traveling block 106 for raising and lowering a drill string 108. A kelly 110 supports the drill string 108 as it is lowered through a rotary table 112. The kelly 110 may be, for example, a four or six-sided pipe configured to transfer rotary motion to a turntable 130 and the drill string 108. A drill bit 114 is driven either by a downhole motor and/or via rotation of the drill string 108 from the well surface and may include one or more drill collars 126 and 128 arranged at or near the drill bit 114. As the bit 114 rotates, it creates a borehole 116 that passes through various subterranean formations 118. A pump 120 circulates drilling fluid through a feed pipe 122 to the kelly 110, which conveys the drilling fluid downhole through an interior conduit in the drill string 108 and through one or more orifices in the drill bit 114. The drilling fluid is then circulated back to the surface via an annulus surrounding the drill string 108 where it is eventually deposited in a retention pit 124. The drilling fluid transports cuttings and debris derived from the borehole 116 into the retention pit 124 and aids in maintaining the integrity of the borehole 116.

FIG. 1 also shows a logging tool 136 adapted for through-the-bit use. Briefly, with the drill string 108 raised off the bottom of the borehole 116, the logging tool 136 may be inserted into the drill string 108 at the well surface and lowered through the interior of the drill string to the drill bit 114 and beyond into the open borehole 116. A slickline or wireline cable 132 may be used to raise and lower the logging tool 136. The cable 132 may enter the interior of the drill string 108 via a port on the kelly 110 or a special-purpose sub. A slickline cable provides only mechanical support, while a wireline cable 132 can allow the tool to communicate with systems located at the well surface and also may possibly provide some power to one or more tools arranged downhole.

The flow of the drilling fluid (i.e., the mud) may also aid in lowering the logging tool 136 through the drill string 108, the one or more drill collars 126, 128, and into the drill bit 114. Once the logging tool 136 reaches the drill bit 114, a tool port defined in the drill bit may be opened, thereby enabling the logging tool 136 to exit the drill bit 114 into the open borehole 116. Once in the borehole 116, the logging tool 136 may be configured to collect formation data such as resistivity, porosity, density, or collect formation fluid samples. The logging tool 136 may include one or more centralizer arms with sensing pads 134 coupled thereto and configured to contact the inner wall of borehole 116 to obtain measurements of various borehole 116 wall attributes as the tool 136 traverses the formations 118 exposed by the borehole 116. The logging tool 136 may be raised or lowered by the cable 132 to investigate the area of interest below drill bit 114. Alternatively, the logging tool 136 may be arranged in the drill bit 114 and logging may be performed as the drill string 108 is extracted from the borehole 116, thereby saving the time associated with performing a wireline logging operation after completely removing the drill string 108 from the borehole 116. Those skilled in the art will readily recognize that other drill rig configurations may be utilized with the downhole power generation systems and methods as described herein.

Figure 2:
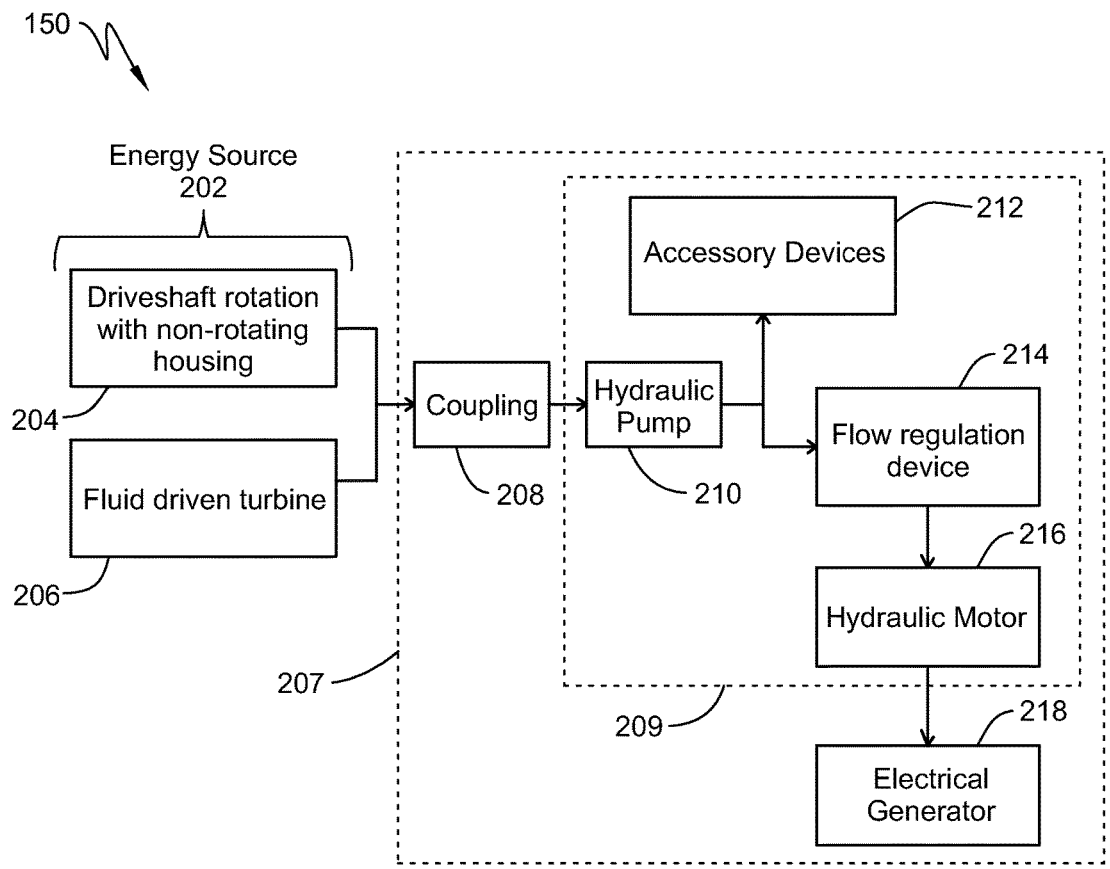
FIG. 2 illustrates a block diagram of a downhole power generation system in accordance with the disclosure.

In one or more embodiments, the logging tool 136, and/or other downhole equipment, can be provided with electrical power using the downhole power generation system 150. For example, referring now to FIG. 2, illustrated is a block diagram of the downhole power generation system 150, according to one or more embodiments of the disclosure. In some embodiments, the system 150 may include an energy source 202 communicably coupled to and configured to provide input energy to a power generation unit 207. The energy source 202, in at least one embodiment, may derive its input energy based on angular kinetic energy derived from a drive shaft 204, such as the drill string 108 of FIG. 1. In other embodiments, the energy source 202 may derive its input energy from a fluid-driven turbine 206 driven by, for example, the drilling fluid (i.e., mud) circulating in and out of the drill string 108.

As depicted in FIG. 2, the power generation unit 207 may include a coupling 208 that communicably couples the energy source 202 to a hydraulic pump 210 arranged within a hydraulic circuit 209. The coupling 208 allows useful energy or power to be transferred from the energy source 202 to the hydraulic circuit 209. The hydraulic circuit 209 receives power from the pump 210, and is configured to regulate the flow of hydraulic fluid circulating within a part or all of the circuit 209 forming a closed loop system. In some embodiments, the hydraulic circuit 209 may include one or more accessory devices 212 either fluidly or communicably coupled to the hydraulic pump 210 and configured to receive hydraulic pressure from the hydraulic pump 210 in order to operate one or more of the hydraulic accessory devices 212. An accessory device 212 can be any drilling tool or component that uses hydraulic fluid flow for its operation. Examples include, but are not limited to, telemetry tools, formation sampling tools, rotary steerable tools, and the like. In at least one embodiment, one accessory device 212 may include an accessory pump used to power one or more downhole tools.

The hydraulic circuit 209 may also include a flow control or flow regulation device 214 communicably or otherwise fluidly coupled to the hydraulic pump 210. The flow regulation device 214 may be configured to regulate the flow of the hydraulic fluid as introduced to a hydraulic motor 216 communicably or otherwise fluidly coupled thereto. The hydraulic motor 216 may be communicably coupled to an electrical generator 218 configured to receive a power input from the hydraulic motor 216 and thereby generate electrical power.

In operation, the energy source 202 may be used to drive the hydraulic pump 210 via the coupling 208. The coupling 208 allows the energy source 202 to be coupled either indirectly, such as through a magnetic coupling or multiple gears and/or drive shafts, or directly, such as via a seal arrangement configured to isolate the drilling fluid from the hydraulic fluid of the hydraulic circuit 209. Any suitable seal may be used for such a seal arrangement. Examples of suitable seals are made commercially available by Kalsi Engineering, Inc., under the trade name Kalsi Seals of various series types, e.g., 641 Series, 637 Series, 614 Series, 587 Series, 568 Series, 555 Series, 507 Series, 481 Series, 462 Series, 432 Series, 344 Series, and/or 311 Series type seals. Other suitable seals may of course be used, as known by those skilled in the art.

The hydraulic flow provided by the pump 210 to the hydraulic motor 216, by way of the hydraulic circuit 209, is regulated or otherwise controlled by the flow regulation device 214. This regulated flow from the flow regulation device 214 may be used to turn or otherwise actuate the hydraulic motor 216. In turn, the hydraulic motor 216 may be configured to drive the electrical generator 218 and thereby produce electrical power. Accordingly, the output of the electrical generator 218 may be proportional to the speed of the hydraulic motor 216, which directly depends on the flow rate of the hydraulic fluid provided from the flow regulating device 214. In other words, the design of the flow regulating device 214 may serve to regulate the speed of the hydraulic motor 216 and, therefore, how much power is produced via the electrical generator 218.

Those skilled in the art will readily recognize the several advantages this affords, especially in downhole applications. For example, the flow regulating device 214 may be able to maintain the speed of the hydraulic motor 216 at a relatively constant speed or otherwise within a predetermined speed range. As a result, variations in the output of the electrical generator 218 will be minimized or otherwise entirely eliminated, thereby providing a steady and stable source of downhole power falling within predetermined electrical power requirement parameters. Moreover, since the flow regulating device 214 essentially regulates the speed of the hydraulic motor 216, this steady source of electrical power may be obtained despite any variability in the input energy derived from the energy source 202. Consequently, the size of the electrical generator 218 may be optimally matched to the predetermined flow rate of the hydraulic fluid exiting the flow regulation device 214, thereby increasing the efficiency of the electrical generator 218. Such optimal modifications may further lead to simplified and more robust control electronics for the power delivered by the electrical generator 218.

Figure 3:
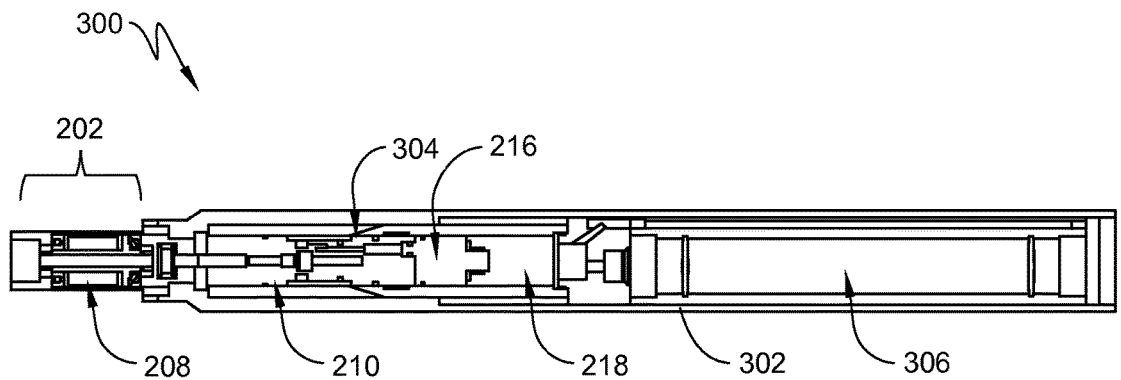
FIG. 3 illustrates an embodiment of an electrical generation system in which a turbine is coupled by way of an indirect magnetic coupling to a hydraulic pump within a housing, in accordance with the disclosure.

Referring now to FIG. 3, illustrated is an exemplary power generation system 300, according to one or more embodiments. The power generation system 300 may be similar in some respects to the power generation system 150 of FIGS. 1 and 2, and therefore may be best understood with reference thereto, where like numerals will refer to like components not described again in detail. The power generation system 300 may receive input energy from the energy source 202 (not detailed) which, as briefly discussed above, may include a fluid-driven turbine or a rotating driveshaft. The energy source 202 may be communicably coupled to the power generation system 300 using the coupling 208. In the illustrated embodiment, the coupling 208 may be an indirect magnetic coupling, but in other embodiments, the coupling 208 may be any other suitable coupling known to those skilled in the art, such as, but not limited to, direct sealed couplings. In some embodiments, for example, the coupling 208 may be a custom magnetic coupling incorporating samarium cobalt magnets. Suitable magnetic couplings may be commercially available through Ringfeder Power Transmission (e.g., HSV Series), Rimtec Corporation, or the Maag Group.

The coupling 208 may be used to communicably couple the energy source 202 to the hydraulic pump 210 as arranged within a housing 302. In embodiments where the energy source 202 is a fluid-driven turbine, the turbine may be driven by mud flow and used to provide rotational energy that drives the hydraulic pump 210. In some embodiments, the fluid-driven turbine may be located within a drill string and driven by drilling fluid circulating through the drill string. In other embodiments, however, the fluid-driven turbine may be located exterior to a drill string component, such as adjacent a drill bit, and may be driven by drilling fluid circulating through the exterior of the drill string and the related bore hole.

The power generation system 300 may further include a hydraulic manifold 304 arranged between the pump 210 and the hydraulic motor 216, where each component is arranged within the housing 302. As discussed above with reference to FIG. 2, the pump 210 may be incorporated within a hydraulic circuit that includes a flow regulation device, such as the flow regulation device 214 of FIG. 2. In FIG. 3, the manifold 304 may be configured to serve as or otherwise retain the flow regulation device 214 (not shown), thereby providing a regulated flow of hydraulic fluid to the hydraulic motor 216. The hydraulic fluid flow through the manifold 304 is consequently regulated or otherwise controlled, and this controlled fluid flow is then used to rotate the hydraulic motor 216 at a relatively constant speed.

The hydraulic motor 216 may be communicably coupled to the electrical generator 218, which may also be suitably arranged within the housing 302. In operation, the electrical generator 218 may be configured to be turned or otherwise actuated in response to the rotational speed of the hydraulic motor 216, and thereby generate electrical power. Since the output of the electrical generator 218 may be proportional to the speed of the hydraulic motor 216, the design of the flow regulating device (as arranged within the manifold 304) may directly affect how much power is ultimately produced by the electrical generator 218. As noted above, this may prove advantageous in minimizing or otherwise entirely eliminating variations in the output of the electrical generator 218, thereby providing a steady and stable source of downhole power that falls within predetermined electrical power requirement parameters.

The power generation system 300 may also include control electronics 306 that may be arranged within a cavity defined in the housing 302. In operation, the control electronics 306 may be configured to control and/or otherwise condition the power generated by the electrical generator 218. In some embodiments, for example, the control electronics 306 may provide AC to DC conversion. In other embodiments, the control electronics 306 may be configured to condition the generated electrical power delivery to various downhole tools, such as dataloggers and related telemetry devices/systems.

Figure 4:
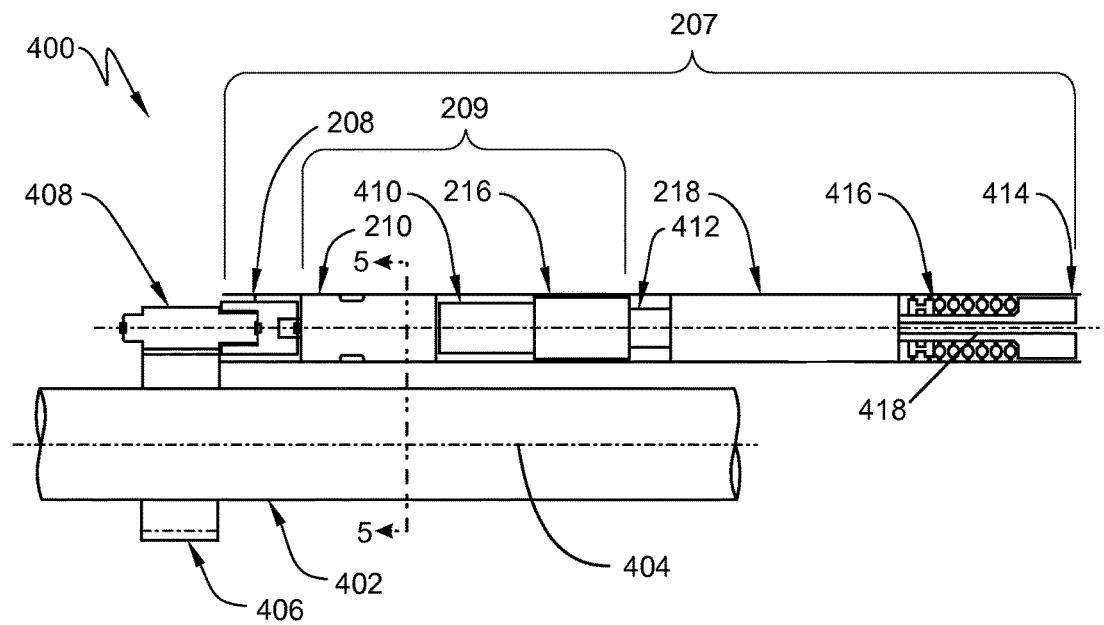
FIG. 4 illustrates an embodiment of an electrical generation system in which a drive shaft is utilized as an energy source, in accordance with the disclosure.

Referring now to FIG. 4, illustrated is another exemplary power generation system 400, according to one or more embodiments. As with the power generation system 300 of FIG. 3, the power generation system 400 may be somewhat similar to the power generation system 150 of FIGS. 1 and 2, and therefore may be best understood with reference thereto. As illustrated, the power generation system 400 may be provided with energy input as derived from a drive shaft 402 having a longitudinal axis 404. The drive shaft 402 may be any rotating downhole tool and may be characterized as the energy source 202 of FIG. 2. In some embodiments, for example, the drive shaft 402 may be a rotating portion of a drill string component.

As illustrated, the power generation system 400 may include the power generation unit 207, which may include the coupling 208, the hydraulic circuit 209, and the electrical generator 218. The drive shaft 402 may be used as a source of angular kinetic energy directed to drive the hydraulic pump 210 which circulates the hydraulic fluid through the hydraulic circuit. In some embodiments a first or drive gear 406 may be coupled or otherwise attached to the outer surface of the drive shaft 402. In other embodiments, the drive gear 406 may be defined in the drive shaft 402, such as being an integral part thereof. The drive gear 406 may be configured or otherwise arranged so as to engage a second or transmission gear 408. In one or more embodiments, the transmission gear 408 may be communicably coupled to the coupling 208 and thereby configured to transmit the angular kinetic energy from the drive shaft 402 to the hydraulic pump 210. As with prior embodiments, the coupling 208 may be either a direct or indirect coupling, without departing from the scope of the disclosure. Moreover, while the first and second gears 406, 408 may be generally described or otherwise depicted in a planetary gear arrangement, those skilled in the art will readily recognize that other suitable mechanical drive configurations and gearing systems may be used.

In the hydraulic circuit 209, the hydraulic pump 210 may again be communicably coupled to a hydraulic manifold 410. Similar to the hydraulic manifold 304 of FIG. 3, the hydraulic manifold 410 may include or otherwise serve as a flow regulation device (i.e., the flow regulation device 214 of FIG. 2), thereby being configured to control and regulate the flow of hydraulic fluid through the manifold 410 in a desired or predetermined manner. The manifold 410 may be communicably coupled to the hydraulic motor 216 which, in turn, is communicably coupled to the electrical generator 218. In one or more embodiments, the hydraulic motor 216 may be coupled to the electrical generator using a coupling or bearing support 412.

The coupling 208, hydraulic circuit 209, and generator 218 may each be arranged within a housing or bulkhead 414, as shown. In some embodiments, a compensator 416, including a spring and hydraulic seal, may also be included within the bulkhead 414 to effectively accommodate temperature-induced variations in the volume of the hydraulic fluid used for the hydraulic circuit 209. The compensator 416 may further define a wire feed-through port 418 used to house a power distribution line coupled to the electrical generator 218. The port 418 may be used to convey the generated electrical power from the electrical generator 218 to various downhole tools and/or devices such as, but not limited to, control electronics, one or more downhole tools, one or more power storage units (e.g., batteries, capacitors, etc., and combinations of such), a related telemetry system, combinations thereof, or the like.

In exemplary operation, rotation of the drive gear 406 provides angular kinetic energy (i.e., rotational energy) to the transmission gear 408 which, in turn, transfers the angular kinetic energy to the hydraulic pump 210 via the coupling 208. Upon receiving this rotational energy, the pump 210 may be configured to convey hydraulic fluid to and through the hydraulic manifold 410, including the flow regulation device which may be configured to regulate or control the flow of the hydraulic fluid in a desired manner. For example, the flow regulation device may be configured to provide constant flow, largely immune to changes in the rotational speed of the pump 210. The regulated flow of hydraulic fluid derived from the manifold 410 may be configured to rotate the hydraulic motor 216 which, in turn, drives the electrical generator 218 at a relatively constant or steady speed. Through such operation of the system 400, electrical power can be generated in a consistent manner despite variations in the conditions of the downhole environment, such as changing mud flow rates or changing drilling rpm.

Figure 5:
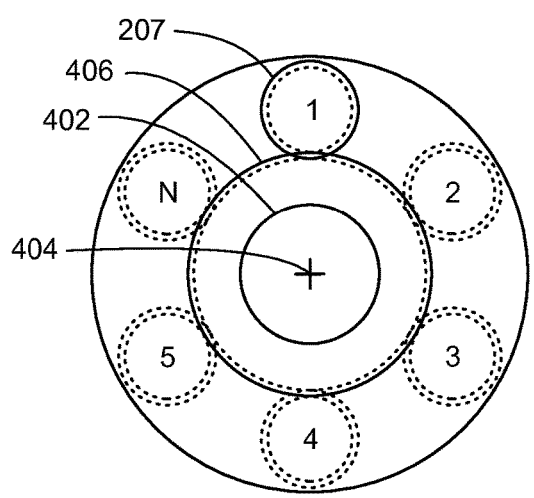
FIG. 5 shows a cross-sectional view along section 5-5 of FIG. 4.

Referring now to FIG. 5, illustrated is a cross-sectional view of the power generation system 400, as taken along section 5-5 of FIG. 4. The sectional view is oriented essentially orthogonal to the wellbore and parallel to the longitudinal axis 404 of the driveshaft 402 of FIG. 4. As shown, a desired number (N) of power generation units, including the power generation unit 207 discussed above with reference to FIG. 4, may be arranged about the circumference of the drive shaft 402, limited only by the geometry of the available volume of space. Specifically, the power generation unit 207 of FIG. 4 is identified as first unit 1, with other power generation units identified as units 2, 3, 4, 5, and N. While only six are shown in FIG. 5, those skilled in the art will readily appreciate that any number of power generation units 1-N may be present in any one application and the specific number will be generally limited only by the available volume presented. Moreover, embodiments are contemplated herein where additional power generation units are arranged axially above or below the ones shown along the length of the drive shaft 402.

The driving gear arrangement between the drive shaft 402 and each power generation unit 1-N is also shown, with the first gear 406 configured as the drive gear. In operation, as the drive shaft 402 and the accompanying drive gear 406 together rotate in one direction, the corresponding transmission gears (e.g., the second gear 408 in FIG. 4) are caused to rotate in the opposite direction, thereby driving the respective hydraulic pumps 210 of each power generation unit 1-N. In at least one embodiment, the drive gear 406, and the several corresponding transmission gears and couplings 208 may be characterized as a coupling system configured to couple the downhole energy source 202 (FIG. 2) to the multiple downhole power generation units 1-N. Those skilled in the art, however, will readily recognize other suitable configurations of coupling systems, including systems of indirect (e.g., magnetic) coupling that may be used, without departing from the scope of the disclosure. In some applications, a coupling or coupling system may include both direct and indirect coupling components.

Referring now to FIG. 6, illustrated is a schematic diagram of an exemplary hydraulic circuit 600, according to one or more embodiments. The hydraulic circuit 600 may be similar in some respects to the hydraulic circuit 209 of FIG. 2, and therefore will be best understood with reference thereto, where like numerals will indicate like elements not described again in detail. As illustrated, the hydraulic circuit 600 includes the hydraulic pump 210 which may be driven by the energy input transmitted through the coupling 208 (FIGS. 2, 3, and 4). In one or more embodiments, a suitable hydraulic pump 210 may be a pump that is commercially-available through Hydro Leduc LP, of Houston, Tex., USA, such as pump model PB 32.5, part number 0512120, which exhibits a swept volume of 0.0027 cubic inches per revolution.

The hydraulic circuit 600 may also include a filter 602, the flow regulation device 214, and one or more pressure relief valves, such as a primary pressure relief valve 604 and a backup pressure relief valve 606. The pressure relief valves 604, 606 may be used to provide an alternate path for hydraulic fluid of the hydraulic circuit 600. For instance, the hydraulic pump 210 may have a fixed volumetric output and, in some embodiments, only a certain percentage or range of the volumetric output is conveyed to the hydraulic motor 216. The filter 602 may be communicably coupled to the discharge of the hydraulic pump 210 and configured to provide filtered or conditioned hydraulic fluid to one or more of the flow regulation device 214, and the primary or backup pressure relief valves 604, 606. In some embodiments, the filter 602 may be a hydraulic filter having a nominal length of about 0.60 inches and configured for a nominal particulate size of 30 microns. It will be appreciated, however, that other suitable filters known to those skilled in the art may also be used, without departing from the scope of the invention. In some embodiments, the pressure relief valves 604, 606 may be configured with a cracking pressure of between about 2200 psi and about 2500 psi, respectively, with a nominal flow point of 1.75 gpm and minimum lift flow of 0.10 gpm. Other pressure relief valves, however, having different operating parameters may be employed, without departing from the scope of the disclosure.

The hydraulic circuit 600 may also include an accumulator 610 to dampen rapid changes in the output of the hydraulic pump 210. In exemplary embodiments, the accumulator 610 may be configured to provide hydraulic fluid storage to be conveyed to the hydraulic motor 216 at a specified time. For instance, the accumulator 610 may be configured to store an amount of hydraulic fluid to operate the hydraulic motor 216 for a predetermined or desired amount of time in the event the hydraulic pump 210 fails to provide enough hydraulic fluid circulation. In some embodiments, for example, the accumulator 610 may store enough hydraulic fluid to operate the hydraulic motor 216 for about two seconds, about 5 seconds, about 30 seconds, about one minute, and more. As will be appreciated, the accumulator 610 may provide enough hydraulic fluid to allow operation of the hydraulic motor 216 for a desired time period, depending on the applications and design constraints of the accumulator 610.

In exemplary embodiments, the flow regulation device 214 may be a pressure-compensated, constant flow device that is configured to produce a desired output flow rate over a relatively wide range of pressure drops experienced across the device 214. In at least one embodiment the flow regulation device 214 may exhibit an output flow rate of about 0.20 gpm, but in other embodiments, other flow rates may be desired or otherwise employed, without departing from the scope of the disclosure. In some embodiments, the flow regulation device 214 may be made of stainless steel or a stainless steel alloy. At least one suitable flow regulation device 214 may be a FLOSERT™ constant flow valve having a nominal flow rate of about 0.35 gpm for a system pressure of about 3000 psi, and commercially-available through the Lee Company of Westbrook, Conn., USA.

The regulated hydraulic fluid output discharged from the flow control device 214 may be supplied to the hydraulic motor 216, which may be communicably coupled (directly or indirectly) to the electrical generator 218. In some embodiments, the hydraulic motor 216 may be a geroter-type motor. In other embodiments, the hydraulic motor 216 may be a micro-hydraulic motor, such as the axial piston hydraulic motor, having model number MH 450, that is commercially available through Hydro Leduc LP. In one or more embodiments, the electrical generator 218 may be specifically selected for a particular downhole application. For example, in at least one embodiment, the generator 218 may be configured to produce between 10 W at 24V and 100 W at 88V, for downhole power usage.

Referring now to FIGS. 7A-7B, illustrated are exemplary flow regulation devices 700A and 700B, respectively, according to one or more embodiments. In some embodiments, one or both of the flow regulation devices 700A and 700B may be similar to the flow regulation device 214 described with reference to FIG. 2 and illustrated in FIGS. 3, 4, and 6, and therefore may be useful for controlled power generation in a downhole environment. Specifically, FIG. 7A illustrates a cross section of the flow regulation device 700A, which may be configured as a constant flow device capable of accepting an input flow with variable pressure (indicated by time varying pressure P(t)), and produce a constant or nearly constant output flow rate (indicated by Q=controlled). As generally discussed with respect to the preceding embodiments, such regulated fluid flow can be conveyed or otherwise provided to the electrical generator 218 of FIG. 2 for downhole power generation.

The device 700A may include a housing 702 that defines an inlet 704, an outlet 706, and a centrally-defined bore 708. A piston 710 may be movably positioned within the bore 708 and configured to respond to changes in pressure experienced between the inlet 704 and the outlet 706. As illustrated, the piston 710 may define an orifice 711 configured to allow hydraulic fluid to flow through the device 700A, from the inlet 704 to the outlet 706 thereof. A spring 712 may be arranged within the bore 708 and configured to bias the piston 710 toward the inlet 704 and thereby resist hydraulic forces applied to the piston 710 via the incoming pressurized hydraulic fluid.

In exemplary operation of the flow regulating device 700A, hydraulic fluid entering the device 700A via the inlet 704 hydraulically impinges upon the piston 710, thereby forcing the piston away from the inlet 704 and toward the outlet 706. The spring 712 may act to resist the hydraulic force applied to the piston 710, thereby urging the piston 710 back toward the inlet 704 and simultaneously equalizing the differential pressure experienced across the device 700A. The pressure of the incoming hydraulic fluid may vary, depending on the speed of the hydraulic pump 210 (FIG. 2), among other factors. The spring 712 may be configured to autonomously react or otherwise adjust to compensate for any pressure variations, thereby providing a constant or steady flow rate exiting through the outlet 706. Specifically, the spring 712 may autonomously adjust the position of the piston 710 within the bore 708, and therefore adjust the size of the flow path (cross sectional area) that the hydraulic fluid passes through on the way to the outlet 706. The higher the pressure of the hydraulic fluid at the inlet 704, the further along the bore 708 the piston 710 is advanced, and the greater the degree of occlusion of the outlet 706 by the piston 710. As will be appreciated, such pressure-sensing capabilities can maintain the output flow at a desired rate, or nearly so, in a way that is largely independent of pressure drops experienced across the device over a given operational range of pressure.

FIG. 7B illustrates a hydraulic diagram for another exemplary flow regulation device 700B useful for power generation according to the present disclosure. As illustrated, the flow regulation device 700B may include first and second solenoid valves 722 and 724 that can be controlled as desired to control the pressure drop felt across the device 700B. The solenoid valves 722 and 724 may be arranged in parallel, as shown, allowing the flow of hydraulic fluid from the hydraulic pump 210 (FIG. 2) to be admitted into both solenoid valves at the same time. The first solenoid valve 722 and the second solenoid valve 724 may be configured to discharge a regulated or controlled flow of hydraulic fluid back into the circuit, e.g., hydraulic circuit 600, and conveyed toward the hydraulic motor 216 (FIG. 2). Accordingly, the flow rate through the flow regulation device 700B can be controlled as desired, and such control may be easily updated or revised in a downhole environment, e.g., by wireless or wired communications from the surface.

As will be appreciated, any suitable solenoid valve(s) may be used. In some embodiments, the first and/or second solenoid valves 722, 724 may be configured for pulse width modulation (PWM) control, though other types of control schemes may be used, without departing from the scope of the disclosure. The total flow rate out of the combined valves can be proportional to the time they are open, e.g., when using PWM control. Using multiple solenoid valves in such a way can allow for a reduction of the total flow rate through an individual valve. This may be advantageous for some applications as flow capacities of individual solenoid valves may not be sufficient for a particular downhole application if only one solenoid valve is utilized. Of course, additional solenoid valves can be used if additional capacity is needed. For the configuration shown in FIG. 7B, one or more pressure relief valves may be used to handle any excess fluid. For other applications, the output of one of the solenoid valves, e.g., the second valve 724, can be routed to return the hydraulic fluid back to the hydraulic pump 210. For such embodiments, one solenoid valve, e.g., first solenoid valve 722, may act as a flow control valve while another solenoid valve, e.g., the second valve 724, may be used to control the actual system pressure by adjusting the bypass flow rate. For such a configuration, the second valve 724 can effectively replace the pressure relief valve(s) shown in FIG. 6.

From the foregoing description and accompanying drawings, it can be appreciated that the present invention provides for downhole power generation using hydraulic fluid with flow control or regulation that is matched or optimized to a given generator size. For instance, the operating speed, or range of speeds, of a particular electrical generator can be matched to the flow conditions provided by the flow regulation devices and components of the disclosed hydraulic circuits (and vice versa). This can allow the generator design to be optimized for that speed or range of speeds. Moreover, the resulting electrical generation can be more uniform and, in addition to providing higher efficiency for a given generator, allow for reduced complexity for any related control electronics/systems used to regulate and distribute the electricity generated. The power generation provided can also allow for a wider operational range for a given mechanical configuration, as opposed to previous techniques that may require changing of turbines, nozzles, and/or gears for different operational parameters encountered in a given downhole environment.

Accordingly, the invention in accordance with the present disclosure is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A downhole power generation system comprising:
an energy source providing input energy from a rotating drill string during a drilling operation;
a hydraulic circuit communicably coupled to the rotating drill string via a coupling to receive the input energy at a hydraulic pump arranged within the hydraulic circuit, wherein the hydraulic pump circulates hydraulic fluid throughout the hydraulic circuit, and wherein the coupling transfers the input energy from the rotating drill string to the hydraulic pump in the form of mechanical energy;
a hydraulic motor arranged in the hydraulic circuit;
a flow regulation device interposing the hydraulic pump and the hydraulic motor within the hydraulic circuit, wherein the flow regulating device receives hydraulic fluid flow from the hydraulic pump and provides a regulated hydraulic fluid flow directly to an inlet of the hydraulic motor which converts the regulated hydraulic fluid flow into a power input; and
an electrical generator communicably coupled to the hydraulic motor, wherein the electrical generator receives the power input and generates electrical power.

2. The system of claim 1, wherein the coupling is a direct coupling.

3. The system of claim 2, wherein the direct coupling includes a seal.

4. The system of claim 1, wherein the coupling is an indirect coupling.

5. The system of claim 4, wherein the indirect coupling comprises a magnetic coupling.

6. The system of claim 1, wherein the flow regulation device is a pressure compensated, constant flow device.

7. The system of claim 1, wherein the flow regulation device comprises:
a first solenoid valve that receives the hydraulic fluid flow from the hydraulic pump; and a second solenoid valve that discharges the regulated hydraulic fluid flow from the flow regulation device and back into the hydraulic circuit.

8. The system of claim 7, wherein the first and second solenoid valves of the flow regulation device are configured for pulse width modulation control.

9. The system of claim 1, wherein the flow regulation device is arranged in a hydraulic manifold that fluidly couples the hydraulic pump to the hydraulic motor.

10. The system of claim 1, wherein the hydraulic circuit and electrical generator are disposed in a housing arranged adjacent the rotating drill string.

11. A method of downhole power generation, comprising:
drilling a portion of a wellbore with a drill bit coupled to a distal end of a rotating drill string;
providing input energy to a hydraulic pump communicably coupled to an energy source, wherein the energy source comprises rotation of the rotating drill string and the hydraulic PUMP is communicably coupled to the rotating drill string via a coupling that transfers the input energy from the rotating drill string to the hydraulic pump in the form of mechanical energy;
circulating hydraulic fluid with the hydraulic pump throughout a hydraulic circuit;
regulating a hydraulic fluid flow received from the hydraulic pump with a flow regulation device and thereby generating a regulated hydraulic fluid flow, the flow regulation device interposing the hydraulic pump and a hydraulic motor within the hydraulic circuit;
providing the regulated hydraulic fluid flow directly to an inlet of the hydraulic motor;
converting the regulated hydraulic fluid flow into a power input with the hydraulic motor; and
receiving the power input with an electrical generator and thereby generating electrical power, the electrical generator being communicably coupled to the hydraulic motor.

12. The method of claim 11, further comprising distributing electrical power from the electrical generator to a downhole tool.

13. The method of claim 11, wherein the coupling comprises a direct coupling.

14. The method of claim 11, wherein the coupling comprises an indirect coupling.

15. A downhole power generation system comprising:
a rotating drill string that provides input energy;
a plurality of power generation units arranged about an outer surface of the rotating drill string, each power generation unit comprising:
a hydraulic circuit communicably coupled to the rotating drill string via a coupling that transfers the input energy to a hydraulic pump arranged within the hydraulic circuit and the hydraulic pump circulates hydraulic fluid throughout the hydraulic circuit;
a hydraulic motor arranged in the hydraulic circuit;
a flow regulation device interposing the hydraulic pump and the hydraulic motor within the hydraulic circuit, wherein the flow regulating device receives hydraulic fluid flow from the hydraulic pump and provides a regulated hydraulic fluid flow directly to an inlet of the hydraulic motor which converts the regulated hydraulic fluid flow into a power input; and
an electrical generator communicably coupled to the hydraulic motor, wherein the electrical generator receives the power input and generates electrical power; and
wherein the electrical generator of each power generation unit provides the electrical power to one or more downhole tools.

16. The system of claim 15, wherein one or more of the couplings of the plurality of power generation units is a direct coupling.

17. The system of claim 16, wherein the direct coupling includes a seal.

18. The system of claim 15, wherein one or more of the couplings of the plurality of power generation units is an indirect coupling.

19. The system of claim 18, wherein the indirect coupling comprises a magnetic coupling.

20. The system of claim 15, wherein one or more of the flow regulation devices of the plurality of power generation units is a pressure compensated, constant flow device.

21. The system of claim 15, wherein one or more of the flow regulation devices of the plurality of power generation units comprises:
a first solenoid valve that receives the hydraulic fluid flow from the hydraulic pump; and
a second solenoid valve that discharges the regulated hydraulic fluid flow from the flow regulation device and back into the hydraulic circuit.

22. The system of claim 21, wherein the first and second solenoid valves of the one or more flow regulation devices are configured for pulse width modulation control.

23. The system of claim 15, wherein the flow regulation device is arranged in a hydraulic manifold that fluidly couples the hydraulic pump to the hydraulic motor.

24. The system of claim 15, wherein the hydraulic circuit and electrical generator of one or more of the plurality of power generation units are disposed in a housing arranged adjacent the rotating drill string.

* * * * *